United States Patent Office 3,330,800
Patented July 11, 1967

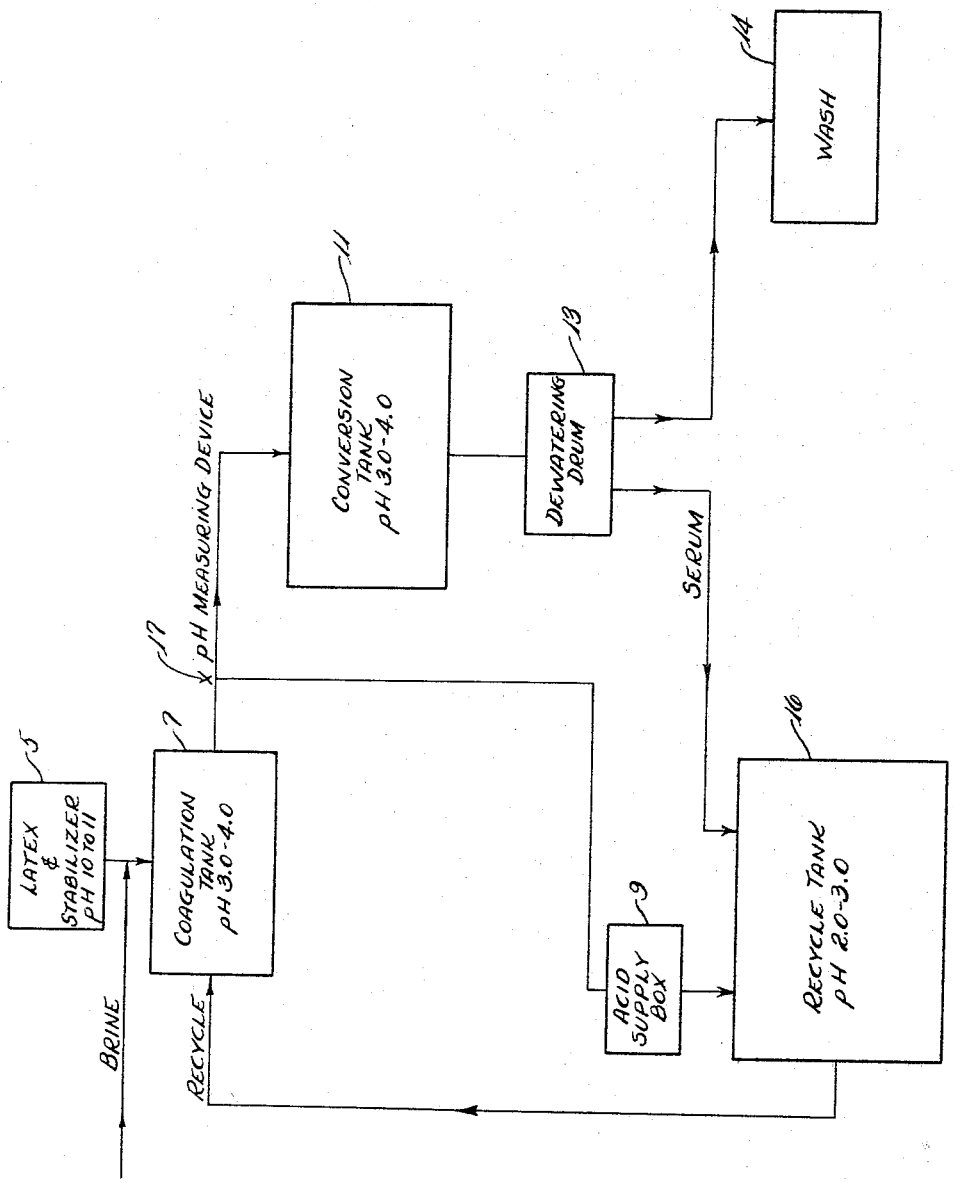

3,330,800
PROCESS FOR COAGULATING BUTADIENE POLYMERS IN THE PRESENCE OF AN IMIDAZOLIDINE-15-THIONE STABILIZER
Wendell S. Cook, Canal Fulton, Ohio, assignor to The Firestone Tire & Rubber Company, Akron, Ohio, a corporation of Ohio
Filed Feb. 13, 1964, Ser. No. 344,746
1 Claim. (Cl. 260—45.8)

This invention relates to a continuous process of utilizing certain salt-forming imidazolidine thione stabilizers in elastomer latexes and the coagulation thereof, with recycling of at least some of the latex serum containing stabilizer salt which has not been coagulated with the elastomer with control of the pH during recycling to retain stabilizer in the latex. This application is a continuation-in-part of my copending application Ser. No. 163,605, filed Jan. 2, 1962.

The stabilizers which can be used in carrying out the process are relatively less soluble in aqueous solutions and latexes of higher pH, and are sharply more soluble in solutions and latexes of lower pH. The difference in solubility is due to the conversion of the stabilizer to its salt in the more acid serum which causes solution of it into the serum from the latex-stabilizer dispersion. The imidazolidine thiones are used, for example, in the stabilization of emulsion SBR and other elastomers which contain at least 50 percent by weight of butadiene.

The imidazolidine thiones which can be used include, for example:

3,11-dimethyl-7,14-diazadispiro-[5.1.5.2]-pentadecane-15-thione
3,11-di-t-butyl-7,14-diazadispiro-[5.1.5.2]-pentadecane-15-thione
3,11-di-t-amyl-7,14-diazadispiro-[5,1.5.2]-pentadecane-15-thione
7,14-diazadispiro-[5.1.5.2]-pentadecane- 15-thione
3,11-di-n-butyl-7,14-diazadispiro-[5.1.5.2]-pentadecane-15-thione
2,10-dimethyl-7,14-diazadispiro-[5.1.5.2]-pentadecane-15-thione
2,10-di-n-butyl-7,14-diazadispiro-[5.1.5.2]-pentadecane-15-thione
2,10-di-t-octyl-7,14-diazadispiro-[5.1.5.2]-pentadecane-15-thione
3,11-dicyclohexyl-7,14-diazadispiro-[5.1.5.2]-pentadecane-15-thione
3,11-diisopropyl-7,14-diazadispiro-[5.1.5.2]-pentadecane-15-thione
2,10-diethyl-7,14-diazadispiro-[5.1.5.2]-pentadecane-15-thione
2,4,10,12-tetramethyl-7,14-diazadispiro-[5.1.5.2]-pentadecane-15-thione
2,3,10,11-tetraethyl-7,14-diazadispiro-[5.1.5.2]-pentadecane-15-thione The process is applicable to treatment of emulsion elastomer polymers generally, and can for example be used on normal SBR as well as low-temperature and oil-extended SBR, and also BR, NBR and ABR.

The stabilizer must be brought together with the elastomer at least before it reaches the coagulation tank. It is added to the latex as a disperson, and creamed with the latex before entering the coagulation tank. In the process of this invention, in which the serum is recycle, the serum is preferably mixed with the creamed latex and stabilizer in the coagulation tank, although they may be mixed before entering the coagulation tank.

Acid is added to the recycled serum to reduce its pH. When this recycled serum of lowered pH is mixed with the latex-stabilizer dispersion which has a relatively higher pH, coagulation occurs yielding the coagulum and a serum with a pH lower than that of the original latex-stabilizer dispersion. During this coagulation the recycled serum of lower pH preferentially extracts and/or dissolves through the means of salt formation, a portion of the imidazolidine thione stabilizer which should normally be retained in the coagulum. In a continuous coagulation process this extraction, due to salt formation, continues for some time yielding initially some coagulum with a lower stabilizer level than desired and some serum containing the extracted, solubilized stabilizer. At first the dissolved stabilizer salt level of the serum is low but it gradually increases to a point where it is relatively constant. At this point an equilibrium is reached between the stabilizer salt in solution in the serum and the stabilizer available for coagulation with the precipitated coagulum. Further extraction of the stabilizer from its dispersion in the latex does not occur and a coagulum is obtained containing the desired level of stabilizer.

The manner of treating the coagulated latex after it leaves the coagulation tank is not an important feature of this invention, and various procedures may be employed. In general, if the latex contains soap, the coagulum will be drawn off into a conversion tank where it is heated and the soap used as an emulsifying agent during polymerization is converted to fatty acid which is retained in the polymer and utilized therein during its subsequent vulcanization. After such conversion of the coagulum it is separated from the serum by means of a de-watering drum or other suitable means, and dried by usual means.

The invention is further described in connection with the drawing which is very diagrammatic and in the nature of a flow sheet to demonstrate the cyclic operation. Brine is preferred for flocculation or creaming of the latex, although other creaming agents known to the art may be employed. Various types of soaps and/or wetting agents, also known to the art, may be present as dispersing agents.

The latex and stabilizer dispersion are mixed in any suitable manner. They may be individually supplied to a mixing tank where they are subjected to intensive agitation. This mixture is then creamed. The creamed product may be mixed with the recycling serum or may be added separately to the coagulation tank. The latex, which is of relatively high pH, neutralizes some of the acid in the recycled serum, increasing the pH of the mixture so that there is less interchange of the stabilizer in the coagulated latex and in the serum. For instance, the pH of the creamed latex in the coagulation tank may be 3.0 to 4.0, whereas the pH of the acidified recycled serum may be 2.0 to 3.0.

From the coagulation tank the latex is shown as being drawn off into the conversion tank where it is heated for conversion of the soap used as a dispersing agent, to fatty acid which is retained in the coagulum and utilized in the subsequent vulcanization of the elastomer.

The converted latex, which has the same pH as it had in the coagulation tank, is shown as being drawn off to a de-watering drum where the coagulum is separated from the serum and the coagulum is delivered to a wash tank for washing and subsequent drying by any usual means. Other separating means may be employed.

The serum is usually collected in a recycle tank as shown, for return to the coagulation tank. The pH of the serum as it leaves the coagulation tank is advantageously used as a control for the amount of acid delivered from the acid supply box to the recycle tank. The pH of the serum in the recycle tank is thereby controlled and adjusted so that when again mixed with the latex the pH of the newly separated serum is maintained at a constant level so that the equilibrium Stabilizer+Acid⇌Stabilizer acid salt is not disturbed and there is substantially no interchange of the stabilizer between the incoming latex-stabilizer dispersion and the serum.

In order to place the recycling operation into practice, it is necessary to change the pH from that normally maintained in the coagulation tank, and the pH suggested may be changed as required, depending upon the pH of the entering latex and other operating conditions, to provide the equilibrium concentration of stabilizer necessary to preserve the cyclic operation.

The showing and description of the process are illustrative, and the invention is not limited thereto. Ordinarily the amount of stabilizer desired in the elastomer will be between 0.5 and 1.25 parts by weight per 100 parts of the elastomer. The foregoing pH figures apply more particularly to 7,14-diazadispiro - [5.1.5.2] - pentadecane-15-thione.

The following is further illustrative. For this purpose reference is had to treatment of SBR–1006 latex, a copolymer of 71 parts of butadiene and 29 parts of styrene, polymerized for 17½ hours at 122° F. and then stripped of monomer by the usual manufacturing procedure and collected in a large (e.g. 50,000 gallon) holding tank 5 prior to the incorporation of the antioxidant.

The antioxidant used was 7,14-diazadispiro-[5.1.5.2]-pentadecane-15-thione. A slurry was prepared using a 10 percent casein solution (ammonium caseinate) prepared as follows:

|  | Parts by weight |
|---|---|
| Casein | 100 |
| Aqueous ammonia (28%) | 21.5 |
| Phenol (preservative) | 2.5 |
| Water | 877.5 |
|  | 1000. |

The phenol was added to the water and the solution was heated to 180° F. The casein was added to the heated solution with vigorous agitation. When the casein was thoroughly suspended the ammonia was added. The solution was then permitted to cool to room temperature.

The antioxidant dispersion was prepared from said thione, using the following materials:

|  | Parts by weight |
|---|---|
| Thione | 100. |
| Surfactant [1] | 2.4 |
| Bentonite clay | 3.0 |
| Above caseinate solution at 10% | 15.0 |
| Water | 220.5 |
|  | 340.9 |

[1] Actually two surfactants were used, namely 0.4 part of Triton X-100 (iso-octyl-phenyl ether of polyethylene glycol, manufactured by Rohm & Haas) and 2.0 parts of Daxad 15 (sodium naphthalene sulfinate manufactured by W. R. Grace & Co.).

The water, heated to room temperature, was added to a make-up tank. The surfactants, bentonite clay and casein solution were added and thoroughly mixed. The thione was then added and the solution agitated. The resulting aqueous suspension was passed through a colloid mill until there was less than 0.5 percent of the thione retained on a 325-mesh screen and until the settling rate was less than 1 ml. per 100 ml. in 30 minutes.

Sodium hydroxide was added to adjust the pH to 9.5 to 10.5. The dispersion was agitated continuously until used. Water was put in the recycle tank 16 and its acidity adjusted to pH 2.0–3.0, as indicated in the drawing. The calculated amount of the above thione solution was added to this water in the coagulation tank to establish the desired stabilizer+acid⇌stabilizer - acid - salt equilibrium at a pH which is generally about 3.0 to 4.0.

A pH meter is provided with electrodes in the outlet from the coagulating tank 7 at the position 17. As the pH of the coagulated latex, during the continuous operation of the process was raised by the addition of the alkaline latex, the change in pH was measured by the meter which was connected electrically (as shown) with a valve in the acid supply box 9. This valve was actuated to release from the box 9 to the recycle tank 16 the amount of acid required to continuously adjust the pH of the latex back to the desired pH of 3.0 to 4.0.

The amount of the thione slurry required to produce 0.6 part per hundred in the rubber after drying, prepared as above, was pumped into tank 5. The latex containing 25 percent of rubber hydrocarbon (the rest being water and materials remaining from the polymerization process) was added to this tank and the latex and thione were stirred at least 5 hours to obtain a uniform dispersion.

The sodium chloride solution or brine in an amount equal to 13.4 grams per 100 pounds (dry weight) of the rubber was added to the latex in the line from the holding tank 5 delivering latex to the coagulation tank 7. Before entering tank 7 the brine-containing latex was passed through a sufficient number of turns or angles to effect creaming. Creaming is a physical phenomenon during which the latex particles are flocculated or partially coagulated. During this procedure the stabilizer particles already in intimate contact with the rubber latex particles are loosely combined with the latex particles. In this manner intimate contact of the stabilizer and the rubber particles was accomplished, so that upon coagulation in the presence of the stabilizer dispersion in the tank 7 the stabilizer was uniformly dispersed and firmly attached directly to the polymer particle to provide stabilizer protection after coagulation.

When the process became continuous, the latex-thione dispersion was creamed as it was pumped into the coagulation tank 7 from the mixing or holding tank 5, where it was mechanically stirred. The latex underwent coagulation at pH 3.0 to 4.0 to form a crumb which floated and overflowed from the coagulation tank and after passing the pH meter was collected in conversion tank 11 where the pH was 3.0 to 4.0. The tank was heated with steam which caused the soap remaining in the rubber from the polymerization process, to be converted to fatty acid.

The rubber crumb recovered from the conversion tank 11 was run over a de-watering drum 13 and then washed at 14. It first went into a wash tank where it was mechanically agitated with fresh water to wash the acid from it. From here the crumb went to a second de-watering drum and thence to a belt drier where substantially all of the water was driven from it. The crumb was then pressed into 100-pound bales.

The significant feature of the process is that by controlling the pH of the coagulation tank 7 at pH 3.0 to 4.0, there is only limited solubilization of the thione stabilizer into the coagulating acid. The very small amount, about 0.1 percent, of stabilizer which is solubilized into the serum in the coagulation tank would remain in the water which undergoes heating in the conversion tank 11. After de-watering the crumb from the conversion tank 11, some (and usually most) of the serum of pH 3.5 to 4.0 containing only about 0.1 percent of the thione is recycled back into the coagulation tank 7 providing an equilibrium between it and the thione extracted from the entering latex in the coagulation tank. In this manner there is provided an equilibrium

$$\text{Thione} + \text{Acid} \underset{}{\overset{\text{pH } 3.0-4.0}{\rightleftarrows}} \text{thione acid salt}$$

which eliminates the further solubilization of the incoming stabilizer in the latex. In the coagulation tank some loss of stabilizer does occur since not all of the serum is recycled but some is lost in overflow. Thus, the pH control of the coagulation tank minimizes the solubilization of the stabilizer and loss of it through the recycle overflow.

The rubber produced as described contained about 0.6 part per hundred of the thione, within the level required for suitable stabilization. At a higher pH of 4.5 to 6.0, for example, coagulation is inefficient and the crumb is not formed properly so that it is necessary to maintain this balance in the coagulation tank.

What I claim is:

The cyclic process of utilizing a salt-forming imidazolidine-15-thione stabilizer in coagulation of an emulsion-polymerized elastomer which contains at least 50 percent butadiene, the water solubility of which salt increases with decrease in the pH of the water, which process comprises creaming a latex of the elastomer and an aqueous dispersion of the stabilizer, and coagulating the same with serum recovered from the process, and maintaining the pH during the coagulation at the level necessary to retain stabilizer at a stabilizing level in the coagulum produced, separating the coagulum and the serum, each containing stabilizer, adjusting the pH of the serum to maintain the desired distribution between the stabilizer salt retained in the coagulum and that in the serum when the serum is mixed with fresh latex, and then continuously reusing part of the serum separated as aforesaid.

References Cited
UNITED STATES PATENTS

| | | | |
|---|---|---|---|
| 3,112,288 | 11/1963 | Davis et al. | 260—94.7 |
| 3,205,194 | 9/1965 | Oberster et al. | 260—45.8 |
| 3,205,195 | 9/1965 | Cook | 260—45.8 |

JOSEPH L. SCHOFER, *Primary Examiner.*

H. I. CANTOR, *Assistant Examiner*